Aug. 13, 1929.   L. H. C. CAIN   1,724,791
ROPE HITCH
Filed Oct. 20, 1928

Inventor
L. H. C. Cain

By Clarence A. O'Brien
Attorney

Patented Aug. 13, 1929.

1,724,791

UNITED STATES PATENT OFFICE.

LLOYD H. C. CAIN, OF SANTA ANA, CALIFORNIA.

ROPE HITCH.

Application filed October 20, 1928. Serial No. 313,859.

The present invention relates to a rope hitch and is particularly intended for use in connection with automobile tow lines.

In the present use of tow lines for automobiles and the like, it is the common practice to extend one end of the line about a portion of the vehicle and to tie the same thereto. This results in chafing of the rope as well as the possibility of the line becoming untied, which naturally results in the delay and inconvenience and possibly injury to the car.

It is accordingly an object of the present invention to provide a strong, durable and simple rope hitch of the class described, which is adapted to be permanently attached to one end of the tow rope and capable of being easily and quickly arranged in position upon a part of the car without danger of becoming disengaged therefrom through chafing and breaking of the rope.

Figure 1:
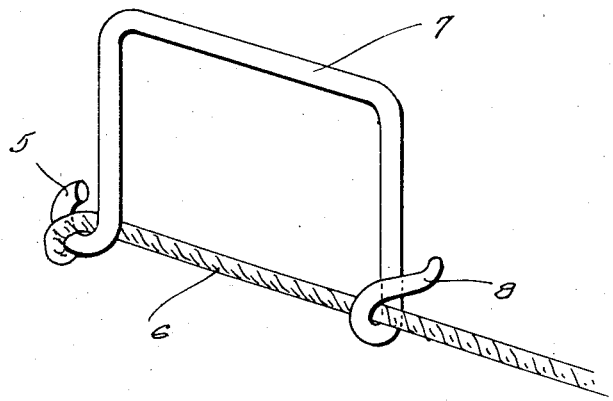
Figure 2:
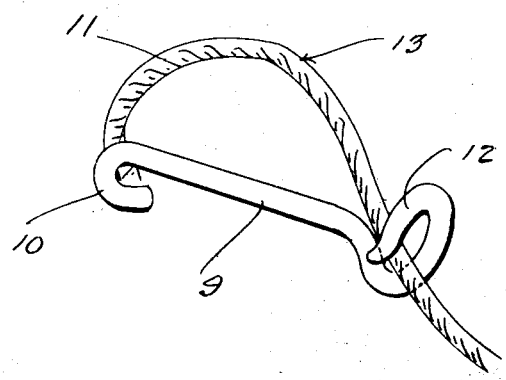

Other objects and advantages of the invention will become apparent as the nature of the invention proceeds and when taken in connection with the accompanying drawings, forming a part hereof, wherein:

Figure 1 is a perspective view of one form of the invention adapted particularly for attaching to the axle or other part of the vehicle of a non-circular formation, and Figure 2 is a similar view of a modified form of the invention employed for use in attaching to a part of the vehicle of a rounded formation.

Referring now to the drawing in detail and more particularly to Figure 1 thereof, it will be seen that the invention comprises a rope hitch constructed of bar material and substantially of a U-shaped formation, with one end formed into an eye 5 through which one end of the rope 6 is permanently attached. The U-shaped member 7 is preferably constructed of malleable material with its opposite end 8 of a slightly greater length than the end 5 and of a tapering formation, enabling the same to be readily bent over a portion of the rope 6. In practice the U-shaped member is arranged in the nature of a saddle, upon the axle or similar rigid portion of the vehicle to be towed, with the rope 6 extended beneath the same. The end 8 of the member is disposed forwardly so that the same may occupy a convenient position for twisting or releasing the same from the rope 6. It will be apparent from the foregoing that upon arranging the hitch upon the vehicle in the manner indicated, the rope 6 will be securely attached to the vehicle without the danger of becoming broken from chafing during the towing action.

The form of the invention illustrated in Figure 2 of the drawing is designed particularly for attaching the rope to rounded objects and comprises a straight section of bar material 9 having one end formed into an eye 10 and to which one end of the rope 11 is attached.

The rope extends parallel with the bar 9 and is secured to the opposite end of the bar by bending the end of the bar about the rope as indicated at 12. The rope is loosely engaged by the bent end 12, in order that a loop 13 may be formed integral for extending about a part of the vehicle to be towed.

It is obvious that the invention is susceptible of various changes and modifications without departing from the spirit or scope of the invention or sacrificing any of its advantages, and I accordingly claim all such forms of the device to which I am entitled.

I claim:

A tow rope hitch adapted to be formed from a single length of material comprising a substantially U-shaped member including spaced legs, and a connecting bight portion, an eye formed on the terminal of one leg and disposed laterally thereof, a rope permanently secured to said eye, and a hook on the outer end of the other leg disposed laterally thereof for receiving an intermediate portion of the rope and having the bill thereof curved over said leg for preventing accidental displacement of the rope therefrom.

In testimony whereof I affix my signature.

LLOYD H. C. CAIN.